P. MONAGHAN.
Cultivator.
No. 26,606.
Patented Dec. 27, 1859.
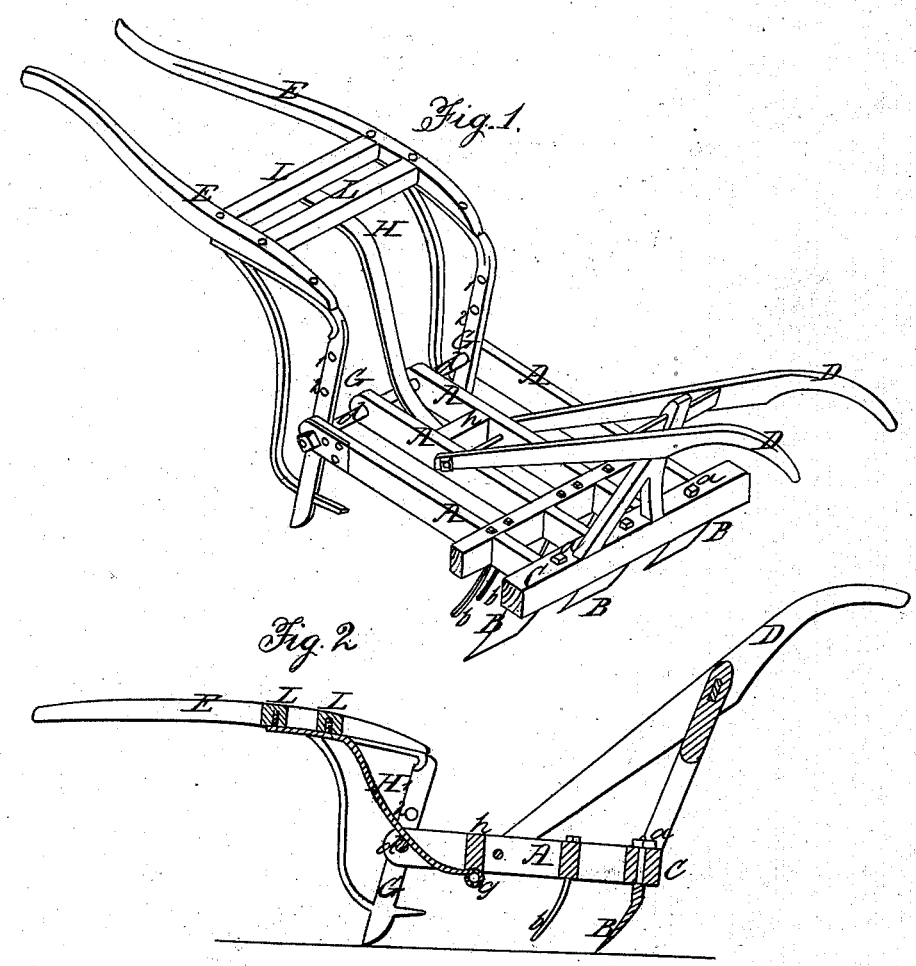

United States Patent Office.

PETER MONAGHAN, OF CAMAK, GEORGIA.

IMPROVEMENT IN COTTON-CULTIVATORS.

Specification forming part of Letters Patent No. 26,606, dated December 27, 1859.

*To all whom it may concern:*

Be it known that I, PETER MONAGHAN, of Camak, in the county of Warren and State of Georgia, have invented certain new and useful Improvements in Cotton-Cultivators; and I do hereby declare that the following is a full, clear, and exact description of the construction and operation of the same, reference being had to the accompanying drawings, in which—

Figure 1 represents a perspective view of said cotton-cultivator. Fig. 2 represents a longitudinal vertical section through the same.

My invention relates to that class of cotton-cultivators which are used for thinning or chopping out the cotton-plants from the rows.

To enable others skilled in the art to make and use my invention, I will proceed to describe its construction and operation.

A represents the cultivator-frame.

B represents hoes, which are used for chopping out the cotton, and the shanks of which are secured to the beam C of the frame by means of the screw-nuts $a$.

$b$ represents rake-teeth, which are secured to the frame A in front of the hoes B, and which are intended to remove obstructions which might be ahead of the hoes.

D represents handles, which are secured to the frame A, and by means of which its rear end can be raised or lowered.

E represents the shafts, to which the horse is attached. They are secured to the braces G, which support the front end of the frame. The frame A is hinged to the braces G, and consequently to the shafts E, by means of the rod $d$, which passes through the holes in said braces and in the frame A, and the latter can swing freely on said rod. The height of the front end of the frame A can be adjusted by inserting the bolt $d$ into one of the holes 1 and 2 of the braces G.

H represents a strong spring, which is secured to the cross-pieces L of the shafts E. It is of the shape represented in the drawings, and rests on the bolt $d$ as its bearing, while its free end $g$ is in contact with the frame A and tends to press it upward by bearing against the lower side of the cross-piece $h$ of the frame A. This spring greatly facilitates the work of chopping out the cotton as it presses the frame upward, and thus when the operator releases the handles D the hoes B are raised from the ground automatically, thereby relieving the operator from the heavy task of frequently raising the rear end of the machine.

The operation of this machine is as follows: The cultivator is drawn over the field in a direction so as to cross the rows of cotton-plants at right angles. The rakes $b$ remove any obstructions which might be ahead of the hoes B, and as soon as the latter reach a row of cotton-plants the operator presses down the rear end of the machine by means of the handles D, and the hoes B enter the ground. On releasing the handles D the spring H raises or aids in raising the rear end, and thus the plants are chopped out with facility, as the operator has only to depress the frame at certain points, and is relieved from raising the entire weight of the frame by the action of the spring H.

Having thus fully described the nature of my invention, I would state that I am aware that the frame of a cotton-cultivator has been hinged to the tongue, so as to swing freely on said hinge for the purpose of raising or lowering its rear end. This I do not claim; but

What I do claim as my invention, and desire to secure by Letters Patent, is—

In combination with the hinged frame of a cotton-cultivator, the spring H, which is secured to the tongue of said cultivator for the purpose of automatically raising the rear end of the machine when the same is released by the operator, substantially in the manner herein described.

PETER MONAGHAN.

Witnesses:
 A. R. BOHLER,
 HENRY W. BRUCE.